Feb. 4, 1969 JUN TAGA 3,425,092
APPARATUS FOR MOULDING SECTIONS OF CIRCULARLY BENT TUBING
FROM THERMOPLASTIC MATERIAL
Filed July 21, 1965 Sheet 1 of 2
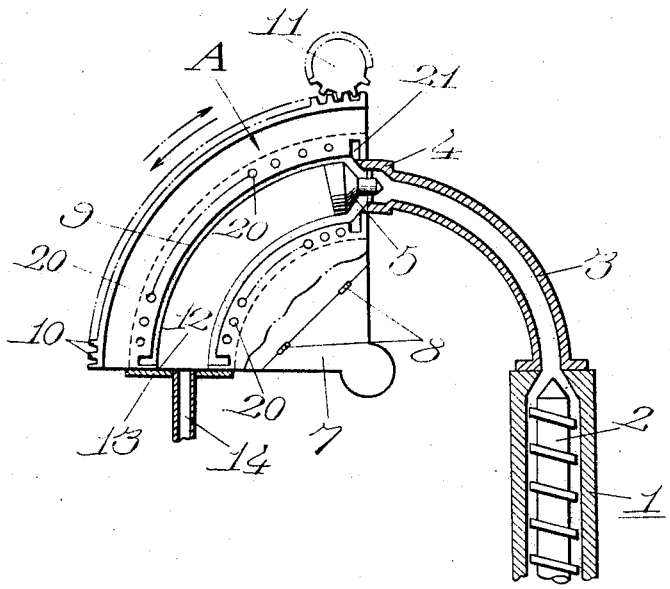
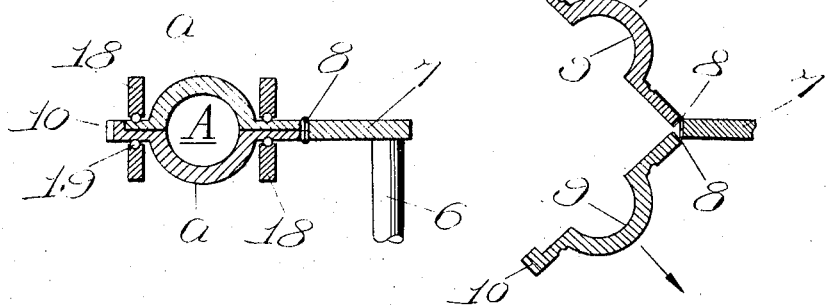
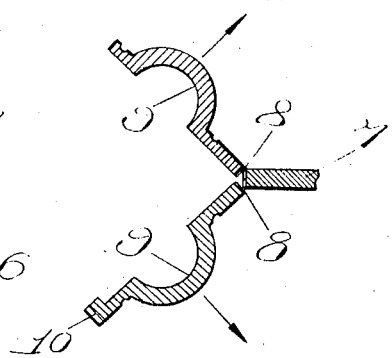
INVENTOR.
JUN TAGA Feb. 4, 1969

JUN TAGA 3,425,092

APPARATUS FOR MOULDING SECTIONS OF CIRCULARLY BENT TUBING
FROM THERMOPLASTIC MATERIAL

Filed July 21, 1965

INVENTOR.
JUN TAGA

United States Patent Office 3,425,092
Patented Feb. 4, 1969

3,425,092
APPARATUS FOR MOULDING SECTIONS OF CIRCULARLY BENT TUBING FROM THERMOPLASTIC MATERIAL
Jun Taga, No. 5664 Ikuta Kawasaki, Kanagawa Prefecture, Japan
Filed July 21, 1965, Ser. No. 473,602
Claims priority, application Japan, July 24, 1964, 39/41,713
U.S. Cl. 18—12          5 Claims
Int. Cl. B29d 23/04

ABSTRACT OF THE DISCLOSURE

An apparatus for molding section of circularly bent tubing from thermoplastic material is formed of an extruder arranged to force molten thermoplastic material, in turn, through a pipe, a die and a die mandrel and then into a mold. The mold and the pipe have substantially the same radius of curvature as the tubing being formed and the mold is formed of hinged parts for removal of the tubing.

Summary of the invention

This invention relates to an apparatus suitable for moulding circularly bent tubing from thermoplastic material.

Up to the present time, various moulding operations such as the injection moulding, casting and compression moulding have usually been employed for moulding circularly bent tubing. However, when such tubular members are made from thermoplastic material, these known moulding operations are not very successful since the synthetic polymers produced through polymerization or condensation such as synthetic resin, are subjected to chemical changes to such an extent that the physical properties of the product are noticeably affected. Moreover, it has been considered difficult to produce moulded articles continuously and efficiently through these moulding operations.

The present invention is directed to the solution of these problems and the object thereof is to provide apparatus for moulding circularly bent tubing from thermoplastic material efficiently and continuously without adversely affecting the physical properties of the finished articles.

More particularly, the present invention resides in the method for moulding circularly bent tubing from thermoplastic material in which the circularly bent metal mold or molds are each composed of disconnectable mold halves movably installed to slide against the circular external surface of a die secured to the nozzle side of an extruder and the mold is moved sequentially while in engagement with the die surface and the molten thermoplastic material is continuously extruded towards the metal mold through a die orifice formed by the inclined end surface of the die and the conical surface of a die mandrel secured to the inner surface of the die.

Description of the drawing

For a better understanding of the present invention, an apparatus for carrying out the present invention is illustrated in the attached drawings, in which:

FIG. 1 is a top plan view, shown partially in section, of a substantial part of the apparatus for carrying out the unitary moulding operation;

FIG. 2 is a view in cross-section of the metal mold of the apparatus of FIG. 1, showing the component split metal molds thereof clamped together for performing the moulding operation;

FIG. 3 is a view in cross-section of the split metal mold of FIG. 2, showing the component split metal molds thereof opened at a hinge;

Detailed description of the invention

Figure 4:
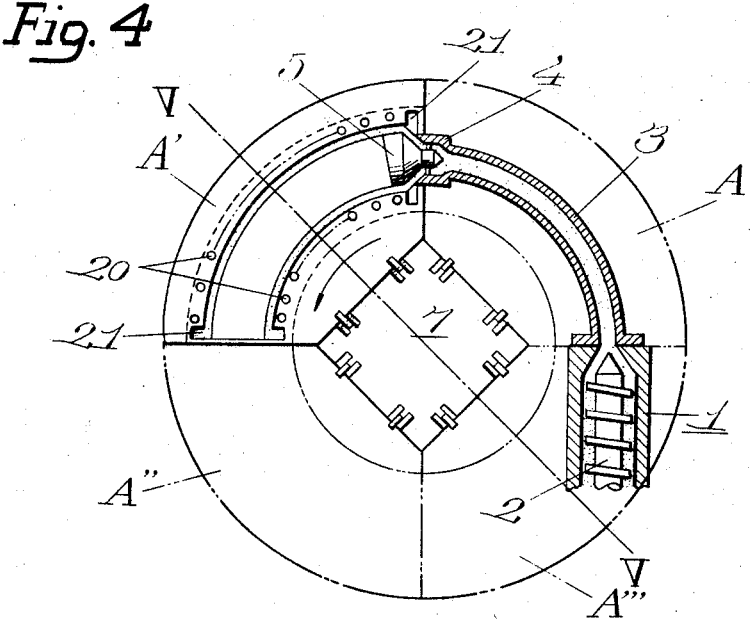
FIG. 4 is a top plan view, shown partially in section, of the substantial part of the apparatus provided with a plurality of split molds for carrying out the moulding operations consecutively.

The present invention will now be described with special reference to the apparatus illustrated in these drawings.

In the attached drawings, an extruder 1, having a screw 2 mounted therein, supplies molten thermoplastic material to a pipe 3 bent in a quarter of a circle with a desired predetermined radius γ and secured at one end to the nozzle of the extruder 1. A circularly bent die 4 is attached to the other end of the pipe 3 and has a die mandrel 5 secured thereto, the conical end surface of the die mandrel 5 defining a die orifice, together with the inclined end surface of the die 4, for molten thermoplastic material extruded from the die towards the metal mold A. In the case of the unitary molding operation as shown in FIG. 1, the metal mold A is composed of disconnectable mold halves a, a bent in the shape of a circular arc with a radius of curvature γ equivalent to that of the pipe 3 and attached together in a horizontal plane by the hinge 8 secured to the support plate 7 which in turn is mounted on the shaft 6 so that the mold halves a, a are free to swing apart from each other about the hinge 8. The inside of the mold halves a, a forms a mold cavity defined by the curved surfaces 9, 9 each spaced apart from the inclined end surface of the die and the curved peripheral surface of the die mandrel to form a desired clearance therebetween when the upper and lower mold halves a, a are clamped to each other, so that the molten thermoplastic material is supplied continuously inside said mold cavity by way of said clearance when said metal mold A is rotated circularly about the shaft 6. The rotary movement of the curved metal mold A about the shaft 6 is imparted by the pinion 11 in mesh with the teeth provided on the peripheral surface of the metal mold A and thereby the latter is rotated about the shaft 6 in the direction indicated by the arrow mark in FIG. 1.

Figure 6:
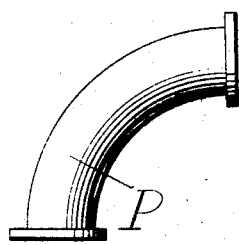
FIG. 6 is a plan view of the moulded article.

In the case of a unitary moulding operation, the metal mold A is superposed concentrically on the pipe 3 in advance of the moulding operation. With the start of the extruding operation of the extruder 1 rotary movement is imparted to the pinion 11 which rotates the metal mold A slowly in the proceeding direction of the molten thermoplastic material. The thermoplastic material is extruded from the die orifice in an annular form and is supplied continuously to the mold cavity or to the inside of the curved inner surfaces of the mold A while an amount of compressed air is supplied through inlet pipe 14 see FIG. 1 mounted on the screen 13 on the end opening 12 of the mold A, whereby the molten thermoplastic material disposed inside mold cavity 9 during the moulding operation is trimmed in outward figure and may eventually have the shape of a finished tubing. After the elapse of a certain interval of time following the completion of the extruding operation the metal mold is separated into the upper and lower mold halves a, a and the product P is removed from the mold cavity of metal mold A. The same moulding operations may be repeated to obtain a desired number of pieces of bent tubing P such as are shown in FIG. 6.

In the case of a continuous moulding operation as shown in FIG. 4, two or more metal molds A, A', A" . . . each having the form of a circular arc and rotatable in the predetermined direction or in the proceeding direction of the molten thermoplastic material are mounted on the support plate 7 and are rotatable about the shaft 6 thereof. The split metal mold A, which in the cause of its rotation in sequence has reached the position of the feeding pipe 3, is clamped on the hinge 8 and rotated in the same direction along with the flow of the molten thermoplastic material extruded from the die orifice of the die mandrel 5, note the direction indicated by the arrow mark, until the metal mold A is rotated a quarter of a circle and assumes the position of A'. This completes the first moulding operation and as the metallic mold assumes the position of A" the metal mold is opened and the moulded product P may be removed from the cavity of the metal mold A.

After the product is removed from inside of the mold A, the opened metal mold A is rotated until it returns again by way of the position of A''' to the position of A to complete one cycle of the moulding operation.

In the case of the continuous operation, as above described, the moulding operation is performed sequentially by rotating in turn the circularly disposed metal molds A, A' . . . about the shaft 6 at their center whereby the production of finished articles is remarkably increased. It is to be noted that in this case of the continuous moulding operation the support shaft 6 is provided with transmission gear wheel 16 meshing with the drive gear 15, see FIG. 5, and the metal molds A, A' . . . are rotated with the rotation of the shaft 6.

The metal molds A, A' . . . composed of sections so as to be subdivided into a plurality of component mold parts may be used satisfactorily either in the unitary or in the continuous moulding operation and such modifications may naturally be included within the scope of the present invention.

Figure 7:
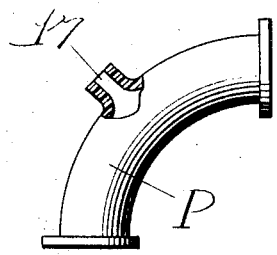
FIG. 7 is a plan view, shown partially in section of an alternative embodiment of the moulded article.

In addition, the technical variations such as providing an opening in the surface of the tubing P to receive the end 17, see FIG. 7, of the other connecting tubing may be attained by a slight modification of the shape of the mold cavity of each of the metal molds A, A' . . . .

Figure 5:
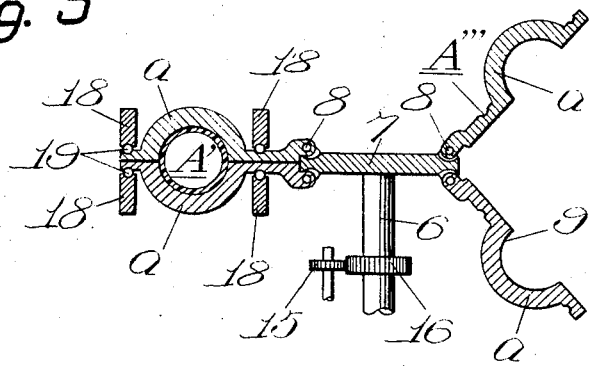
FIG. 5 is a vertical cross-sectional view taken on the line V—V of FIG. 4.

Numeral 18 in the FIGS. 2 and 5 indicate upright pieces which are pressed downwardly to clamp the upper and lower mold halves a, a against each other when pressure moulding is operated. Ball bearings 19 are mounted on the ends of the upright pieces 18 contacting the mold halves a, a and play a part in effecting the smooth rotation of the molds A, A' . . . . A cooling pipe 20 is mounted spirally about the inner surface of the mold A and annular cavities 21 are bored at the opposite ends of the mold cavity 9 and corresponding to the flanges of the moulded product P at the opposite ends thereof.

In accordance with the present moulding operation performed by the circular rotation of the metal mold or molds each composed of vertically separable mold halves, the rotation being synchronized with the extrusion of the molten thermoplastic material from the die orifice of the die mandrel and the metal mold or molds and the die mandrel each having their peripheral surface bent longitudinally in a circular arc so as to conform to the shape of the tubing to be moulded, such tubing may most conveniently be moulded from thermoplastic material, such as vinyl chloride, and the sequentially arranged mechanical operation is provided due to the simplified operation thereof resulting in an increase in production of moulded articles of uniform construction.

What is claimed is:

1. An apparatus for moulding circularly bent tubing sections formed of a thermoplastic material to a predetermined radius of curvature and comprising a pipe bent in a longitudinally extending circular arc having a radius of curvature substantially equivalent to the radius of curvature of the tubing section to be formed, said pipe having a first end and a second end, an extruder secured to the first end of said pipe for supplying and passing molten thermoplastic material therethrough, a die having a die mandrel attached thereto and spaced inwardly therefrom is positioned at the second end of said pipe, said die and die mandrel mounted on the axis of curvature of said pipe, a mould for forming circularly bent tubing sections having a radius of curvature substantially similar to that of said pipe said mold comprising at least two separate longitudinally extending mould parts; and means for clamping said mould parts together, means for mounting said mould for movement in a circular arc coaxial with the axis of said pipe comprising a rotatable shaft, a plate member disposed transversely of the longitudinal axis of said shaft, said separable mould parts hingedly connected to said plate, and means for rotating said mould about said shaft, whereby molten thermoplastic material is forced from said pipe between said die and die mandrel into said mould as the mould is moved along its circular path of travel for forming a section of circularly bent tubing therein.

2. An apparatus as set forth in claim 1, wherein said rotatable shaft is disposed at the center of the circular path of travel of said mould.

3. An apparatus as set forth in claim 1, wherein said means for rotating said shaft comprises a pinion rotatably mounted adjacent the outer periphery of said mould, said mould having a plurality of gear teeth disposed on its outer periphery engaged with said pinion whereby said mould is rotated past said die and die mandrel in the same direction as the passage of molten thermoplastic material from said extruder through said pipe.

4. An apparatus as set forth in claim 1, wherein said means for rotating said shaft comprises a transmission gear wheel located on said shaft, a drive gear disposed adjacent said shaft and engageable with said transmission gear wheel thereon for rotating said shaft and said mould through its circular arc of travel.

5. An apparatus as set forth in claim 1, wherein a plurality of said moulds are hingedly secured to said plate for rotation through the circular path of travel in serial arrangement past said die and die mandrel for continuously forming sections of circularly bent tubing.

References Cited

UNITED STATES PATENTS

| 2,349,549 | 5/1944 | Hardman et al. | 264—308 |
| 2,834,983 | 5/1958 | Norton | 18—14 |
| 3,298,064 | 1/1967 | Taga | 264—209 X |

FOREIGN PATENTS

| 932,897 | 9/1955 | Germany. |
| 250,099 | 10/1963 | Australia. |

ROBERT F. WHITE, *Primary Examiner.*

T. J. CARVIS, *Assistant Examiner.*

U.S. Cl. X.R.

18—14, 20, 30; 25—11, 39; 264—99, 297, 323